May 12, 1931.  R. J. WISE  1,805,349
SIGNAL DISTORTION INDICATOR
Filed Feb. 7, 1928
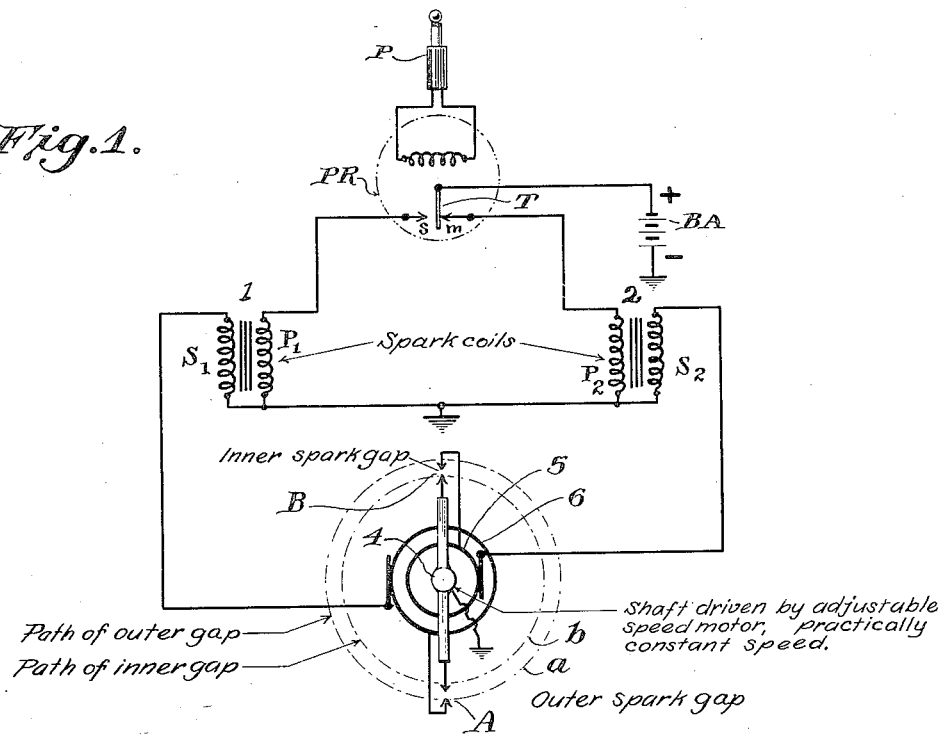
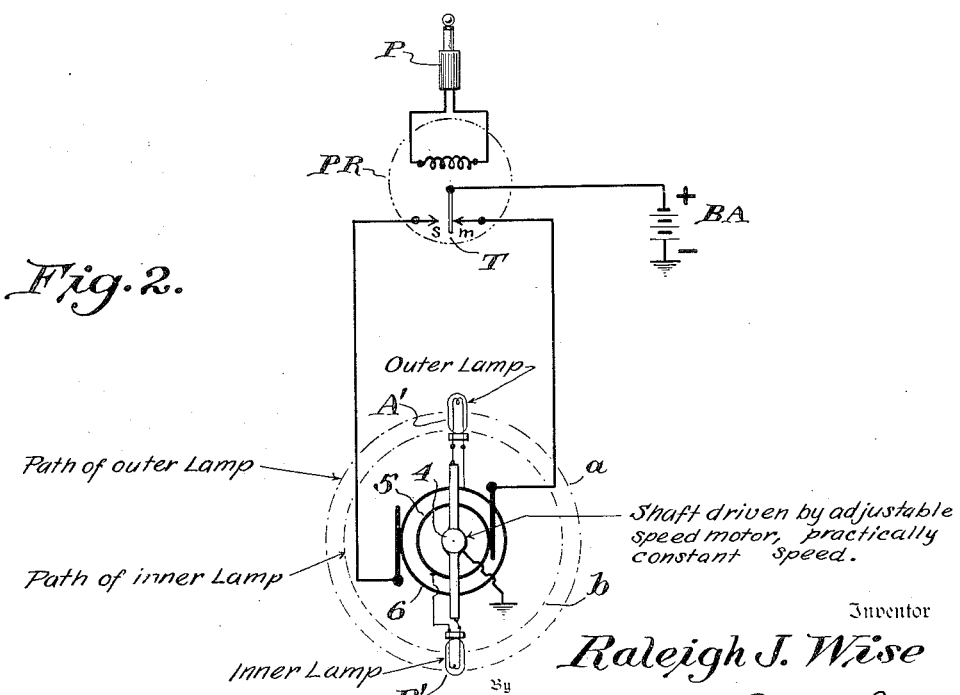
Inventor
Raleigh J. Wise
Eugene C. Brown
Attorney Patented May 12, 1931

1,805,349

UNITED STATES PATENT OFFICE

RALEIGH J. WISE, OF BLOOMFIELD, NEW JERSEY, ASSIGNOR TO THE WESTERN UNION TELEGRAPH COMPANY, OF NEW YORK, N. Y., A CORPORATION OF NEW YORK

SIGNAL DISTORTION INDICATOR

Application filed February 7, 1928. Serial No. 252,564.

My invention relates to telegraph apparatus and in particular to a device for indicating and measuring the distortion of telegraphic signals due to any cause.

An object of my invention is to devise an arrangement for indicating the direction and magnitude of unbalance in a duplex telegraph system during the regular operation of the system.

A further object of my invention is to devise an arrangement for not only indicating the unbalance of a duplex system, but also to indicate distortion of the signals due to other causes such for example, as that caused by induction currents.

I accomplish the objects of my invention by a device which indicates the points of operation of the receiving relay to the "marking" and "spacing" positions in the cycle of operation. By comparing the points of operation in the same cycle, and in different cycles, I am enabled to predict or foretell the nature of unbalance or distortion of the signal.

My invention is illustrated in the accompanying drawings in which:—

Fig. 1 illustrates one form of the invention; and

Fig. 2 a second arrangement.

Referring to Fig. 1, a polarized relay is indicated at PR. In order to observe the signals, connection is made from the relay to the line circuit by means of a plug P. The spacing and marking contacts of the relay are indicated at $s$ and $m$. The tongue T is connected to the positive terminal of a suitable source of current BA, the negative terminal of which is grounded. Spacing contact $s$ is connected to one terminal of the primary winding $P_1$ of a spark coil 1, the other terminal of which is grounded. In a like manner the marking contact $m$ is connected to one terminal of primary winding $P_2$ of a second spark coil 2. A rotary shaft 4, driven by a suitable adjustable constant-speed motor (not shown) carries two concentric collector rings 5 and 6, and two spark gaps A and B. These gaps are diametrically disposed and are arranged at different radial distances from the shaft, the paths of travel of the gaps being indicated respectively by the dotted circles $a$ and $b$. The secondary winding $S_1$ of spark coil 1 is grounded at one terminal and is connected at the other terminal to a brush which engages the collector ring 6. Likewise, the secondary winding $S_2$ of spark coil 2, is grounded at one terminal and connected at the other terminal to a brush which engages the collector ring 5. One terminal of spark gap B is connected to ring 5, and one terminal of spark gap A is connected to ring 6. The remaining terminals of the two gaps are connected to the shaft 4 which is grounded.

The operation of the arrangement shown in Figure 1 is as follows:

The spacing and marking impulses of the incoming signal operate the polarized relay to the spacing and marking terminals respectively. With the tongue of the relay on contact $m$, the primary $P_2$ of spark coil 2, is energized from the battery BA. When a spacing impulse is received, the contact at $m$ is broken and a spark is produced across gap B by the voltage induced in the secondary $S_2$. In a like manner when the contact at $s$ is broken, a spark is produced across gap A by the voltage induced in the secondary $S_1$. It will thus be seen that a spark occurs at gap B upon the beginning of a spacing impulse and a spark occurs across A at the beginning of each marking impulse.

The two spark gaps are rotated in synchronism with the signals, that is, at a speed in revolutions per second equal to the signal speed in cycles per second. If the rotating spark gaps are in perfect synchronism with the received signals, the two sparks appear to remain stationary. It will be noted that if a spark occurs at gap B in the position shown in Figure 1, at the beginning of a spacing impulse, and if the spark gaps are rotated in synchronism with the received signals, the gap A will have rotated into the position now occupied by gap B by the time a marking impulse is received. Therefore, during the normal operation of the system, the two sparks will appear to be stationary on the same radial line. If the speed of rotation is somewhat different from the signal frequency, the positions of the two sparks will drift slowly along their circular paths either forward or backward, depending upon whether the speed of rotation is greater or less than the signal frequency. Although it is desirable to have the speed of rotation adjusted exactly in synchronism with the signal frequency, nevertheless, small discrepancies do not seriously affect the result. Any suitable constant speed motor may be used to drive the shaft 4, such for instance, as the La Cour type which is maintained at a constant speed by a tuning fork and is commonly used to drive the synchronous transmitters and receivers of telegraph apparatus. After the motor is adjusted to operate at the frequency of the incoming signals, the motor will maintain this speed with great accuracy. In making the tests described herein, it is immaterial if a slight departure from synchronism occurs, as the period of each observation is very short and hence any variation in the position around the path of the sparks does not interfere with the required observation.

If perfect and unbiased signals are received, the inner and outer sparks will occur repeatedly at the same peripheral positions. Biased but otherwise perfect signals will be indicated by stationary but peripherally different positions for the inner and outer sparks respectively. Ohmic unbalance manifests itself as a bias, and will, therefore, be indicated in this manner. The direction and extent of displacement of the two sparks will indicate the direction and extent of the unbalance.

Signals distorted in an irregular manner, such as those caused by induction currents, or by unbalance during duplex operation, will be indicated by a scattering of the sparks of the two gaps along their respective paths. The peripheral extent over which the scattering occurs is an indication of the degree or magnitude of distortion present.

Quantitative measurements may be made of the distortion by placing a transparent screen in front of the rotating gaps and graduating it by means of equally spaced radial lines.

The spark gaps A and B may be operated at ordinary atmospheric pressure or they may be enclosed in either evacuated or gas-filled envelopes, as will be apparent to one skilled in the art. Instead or using spark gaps as sources of light, neon filled lamps or other illuminating devices which act instantaneously, may be substituted for the gaps.

A simplified form of my invention is shown in Fig. 2. In this arrangement, the spark coils 1 and 2 are dispensed with and the energization of the two rotating light sources is effected directly through the circuits connected to the spacing and marking contacts of the polarized relay. In other words, the lamps A' and B', which may be ordinary filament type lamps, are connected in the circuit which supplies the primaries of the spark coils 1 and 2 in Fig. 1. In the operation of this arrangement, the lamps remain energized for the entire length of the spacing and marking impulses respectively.

Thus, the spacing impulses produce an arcuate path of light on circle $a$ and the marking impulses an arcuate path of light on circle $b$, and the lengths of the two arcs indicate the duration of the respective impulses. Unbalance during one-way operation, or a steady biasing voltage, will be indicated by relative peripheral displacement of the two arcs, the extent and direction of displacement indicating the extent and direction of unbalance. Irregular distortion will be indicated by a gradual thinning out of the arcs at the ends, and the extent of the arc of reduced illumination will indicate the nature of the distortion.

It will thus be seen that one revolution of rotating shaft 4, indicates the time cycle of the received signals. In Fig. 1, the time of operation of the relay to the marking and spacing positions is indicated by the positions at which the sparks occur across gaps A and B, while in Fig. 2 the time of operation is indicated by the beginning points of the two arcuate light paths.

I have described the two sources of illumination as being located diametrically opposite one another but it will be evident that other arrangements may be used. Thus it might be advantageous under some conditions to place the two sources of illumination on the same radial line and at some other times to locate them at equal distances from the axis of rotation. If they were placed on the same radial line and the speed of rotation in revolutions per second was equivalent to twice the signaling speed in cycles per second, or some multiple thereof, the result obtained would be similar to that previously described. Again if this double speed of rotation were maintained and the sources of illumination were placed 180 degrees apart and at different distances from the axis, two diametrically opposite measures of distortion would be visible on the peripheral paths of rotation.

I claim:

1. In combination, a source of signals comprising positive and negative current impulses transmitted in cycles, a relay responsive thereto, means operated in substantial synchronism with said signals to indicate upon separate paths the time cycle of said respective signals, and means controlled by said relay and cooperating with said first means for indicating the time of operation of said relay for each signal impulse.

2. In combination, a source of signals comprising positive and negative current impulses transmitted in cycles, a relay responsive thereto, two sources of light, means for moving said sources of light upon separate paths in synchronism with the signal current cycle, said sources being displaced 180 degrees in said cycle, and means for energizing one of said sources upon operation of said relay to one position and for energizing the other source upon operation of the relay to the other position.

3. In combination, a source of telegraphic signals comprising marking and spacing current impulses, a polarized relay responsive thereto, means for indicating upon separate paths the time cycle of operation of said marking and spacing signals, and means controlled by said relay for indicating on said time cycle the points of operation of said relay to the marking and spacing positions respectively.

4. In combination, a source of telegraphic signals comprising marking and spacing current impulses, a polarized relay operated thereby, a rotatable member, a source of light carried by said member, an energizing circuit for said light source controlled by said relay in one position, a second source of light carried by said member diametrically opposite the first light source, an energizing circuit for the second light source controlled by said relay in the second position, said light sources being located at different distances from the axis of rotation, and means for rotating said member in synchronism with the signals.

In testimony whereof I affix my signature.

RALEIGH J. WISE.